UNITED STATES PATENT OFFICE.

CHARLES McADAM, OF CHICAGO, ILLINOIS, ASSIGNOR TO CHADELOID CHEMICAL COMPANY, OF NEW YORK, N. Y., A CORPORATION OF WEST VIRGINIA.

COMPOSITION FOR REMOVING PAINT AND VARNISH.

1,274,430.     Specification of Letters Patent.     Patented Aug. 6, 1918.

No Drawing.     Application filed June 14, 1915. Serial No. 33,883.

*To all whom it may concern:*

Be it known that I, CHARLES MCADAM, a citizen of the United States, and a resident of Chicago, in the county of Cook and State of Illinois, have invented certain new and useful Improvements in Composition for Removing Paint and Varnish; and I do hereby declare that the following is a full, clear, and exact description thereof.

In the production of my new composition the process consists in the emulsifying of a suitable wax in a complex emulsion liquid such as a mixture of cresol, alcohol and acetone or equivalent bodies, and while still hot, incorporating the resultant paint and varnish detergent with an evaporation-retarding and thickening composition which may be composed of celluloid, gum camphor and acetone or equivalent bodies. A composition for removing paint and varnish must contain an energetic softening and loosening agent, also a penetrating agent. The penetrating agent must be miscible with the softening agent. This is necessary because both penetrating agent and softening agent must work together, hand in hand at the same time. This requisite for a successful remover is secured in my composition by the combination of a penetrating, acid substance, cresol (cresylic acid,) either ortho, meta or para or a mixture of the three isomers with a softening agent consisting of a mixture of an alipathic alcohol such as grain or ethyl alcohol and acetone or equivalent bodies.

Such a mixture by itself would, however, be inefficient, owing to the tendency of the softening and penetrating bodies to evaporate and run when applied to vertical surfaces. These difficulties are overcome in my new composition by the addition of certain herein described neutral bodies, which have the effect of preventing the rapid evaporation of the softening and penetrating agents and at the same time of permitting the application of the composition to vertical surfaces without flowing away.

An illustrative composition for removing paint and varnish consists of the following ingredients and is prepared in the following manner:

In a tank, surrounded by a water jacket and kept hot by means of steam heat, I first place four gallons of a ketone such as acetone and one and one-half gallons of cresol (cresylic acid). The cresol and the acetone are stirred together and two quarts of spermaceti are then added to the hot mixture and stirred until the ingredients are emulsified. I then add four gallons of alcohol, while stirring rapidly.

To this emulsion preparation, which is in itself a paint and varnish remover, but lacks certain important qualities useful in a successful technical remover composition, I now add a celluloid-gum camphor solution which I prepare as follows:

Seven and one-half gallons of acetone are placed in a tank or churn and nine and one-half pounds celluloid scrap and one and one-half pounds gum camphor are added and thoroughly agitated or churned until the celluloid and camphor are completely dissolved in the acetone. This solution is added to the hot emulsion of cresol, alcohol, acetone and spermaceti and stirred until the various ingredients are thoroughly incorporated with each other.

I am aware that prior to my invention a neutral paint and varnish remover, consisting of wax, precipitated from a neutral hydro-carbon solution by an alcohol, has been patented. The wax in my composition, however, is emulsified and is not dissolved or precipitated, not being soluble in cresol. Cresol is not a neutral hydro-carbon but is a phenolic body with distinct acid characteristics, possessing disintegrating penetrating qualities which, when applied to a painted or varnished surface in some respects are different from those of a neutral hydrocarbon solvent.

It will be understood that I do not limit myself to the foregoing formula or the precise components thereof but may used modifications or equivalents such as fall within the scope thereof.

What I claim and desire to secure by Letters Patent of the United States is:

1. A composition for removing paint and varnish, consisting of a true emulsion, having a distinct acid reaction, in which cresol (cresylic acid) acts as a finish penetrating agent.

2. A composition for removing paint and varnish consisting of an emulsion of cresol, a loosening agent and a wax.

3. A composition for removing paint and varnish consisting of cresol, spermaceti, grain alcohol, acetone, celluloid and gum camphor combined as an emulsion substantially as described.

4. A finish remover of a substantially non-aqueous character comprising finish solvent material with emulsified wax, said remover containing a relatively slowly volatile hydroxy derivative of benzol having an acid tendency and comprising a phenol of the cresol type.

In testimony that I claim the foregoing as my invention I affix my signature in the presence of two witnesses, this 12th day of June A. D. 1915.

CHARLES McADAM.

Witnesses:
TAYLOR E. BROWN,
P. H. ALFREDS.